(12) United States Patent
Yeung et al.

(10) Patent No.: US 11,758,117 B2
(45) Date of Patent: Sep. 12, 2023

(54) METHOD FOR CONTROLLING PROJECTION OF PROJECTION MODULE, PROJECTION SYSTEM, AND STORAGE MEDIUM

(71) Applicant: IVIEW DISPLAYS (SHENZHEN) COMPANY LTD., Shenzhen (CN)

(72) Inventors: Steve Yeung, Shenzhen (CN); Zhiqiang Gao, Shenzhen (CN); Wenxiang Li, Shenzhen (CN); Mingnei Ding, Shenzhen (CN)

(73) Assignee: IVIEW DISPLAYS (SHENZHEN) COMPANY LTD., Shenzhen (CN)

(*) Notice: Subject to any disclaimer, the term of this patent is extended or adjusted under 35 U.S.C. 154(b) by 246 days.

(21) Appl. No.: 17/227,623

(22) Filed: Apr. 12, 2021

(65) Prior Publication Data

US 2021/0235066 A1    Jul. 29, 2021

Related U.S. Application Data

(63) Continuation of application No. PCT/CN2019/118736, filed on Nov. 15, 2019.

(30) Foreign Application Priority Data

Nov. 12, 2019 (CN) .......................... 201911100938.X

(51) Int. Cl.
*H04N 13/363* (2018.01)
*H04N 13/376* (2018.01)

(52) U.S. Cl.
CPC ......... *H04N 13/363* (2018.05); *H04N 13/376* (2018.05)

(58) Field of Classification Search
CPC .......................... H04N 13/376; H04N 13/363
(Continued)

(56) References Cited

U.S. PATENT DOCUMENTS

2005/0117132 A1   6/2005   Agostinelli
2009/0102915 A1   4/2009   Arsenich
(Continued)

FOREIGN PATENT DOCUMENTS

CN   202133957 U   2/2012
CN   107024825 A   8/2017
(Continued)

*Primary Examiner* — John W Miller
*Assistant Examiner* — Omer Khalid
(74) *Attorney, Agent, or Firm* — Carter, DeLuca & Farrell LLP; George Likourezos

(57) ABSTRACT

Embodiments of the present disclosure propose a method for controlling projection of a projection module, a projection system and a storage medium. The method for controlling projection of the projection module includes: obtaining a projection environment where the projection module is located, and determining a position of a target person according to the projection environment; and planning the best projection position in the projection environment according to the projection environment and the position of the target person. The best projection position in the projection environment is planned according to the position of the target person, so that the projection picture projected by the projection module can be adaptively changed along the position of the target person to fit with the current status of the target person to improve the perception experience of the user.

17 Claims, 3 Drawing Sheets

(58) Field of Classification Search
USPC .......................................................... 348/744
See application file for complete search history.

(56) References Cited

U.S. PATENT DOCUMENTS

| | | |
|---|---|---|
| 2011/0181553 A1 | 7/2011 | Brown et al. |
| 2014/0118705 A1 | 5/2014 | Hasegawa et al. |
| 2015/0015699 A1 | 1/2015 | Vieth et al. |

FOREIGN PATENT DOCUMENTS

| | | | | |
|---|---|---|---|---|
| CN | 107027014 A | | 8/2017 | |
| CN | 107027015 A | | 8/2017 | |
| CN | 107065409 A | | 8/2017 | |
| CN | 107656619 A | | 2/2018 | |
| CN | 109960401 A | * | 7/2019 | ............... G06F 3/01 |
| CN | 109960401 A | | 7/2019 | |
| CN | 109982058 A | | 7/2019 | |
| CN | 109993835 A | | 7/2019 | |
| CN | 109996050 A | * | 7/2019 | |
| CN | 109996050 A | | 7/2019 | |
| CN | 109996051 A | | 7/2019 | |
| JP | 2017068697 A | | 4/2017 | |

* cited by examiner

METHOD FOR CONTROLLING PROJECTION OF PROJECTION MODULE, PROJECTION SYSTEM, AND STORAGE MEDIUM

CROSS-REFERENCE TO RELATED APPLICATIONS

This application is a continuation-application of International (PCT) Patent Application No. PCT/CN2019/118736, filed on Nov. 15, 2019, which claims priority to Chinese Patent Application No. 201911100938.X, filed with the National Intellectual Property Administration of China on Nov. 12, 2019, and entitled "method and device for controlling projection of projection module and projection system", the entire contents of which are incorporated herein by reference.

TECHNICAL FIELD

Embodiments of the present disclosure relate to the technical field of digital projection display, and in particular to a method for controlling projection of a projection module, a device for controlling projection of a projection module, and a projection system, and a storage medium.

BACKGROUND

With the rapid development of digital light processing projection technology, it has greatly promoted the rapid development of the projection system. People put forward higher requirements for the projection system. For example, the projection system not only can be used as the display device, but also can be adapted to the dynamic projection of a variety of application scenes. For example, when projecting in a home or a large stage, multi-directional projection needs to be performed; it needs to be synchronized with the projection content; and an immersive experience is constructed through the combination of movement and content.

However, in the current projection products, the projection module used to project the picture is kept in a fixed state. The projection picture is blindly projected to a fixed position, which is difficult to fit the current state of the user, resulting in a poor perception experience.

SUMMARY

An embodiment of the present disclosure proposes a method for controlling projection of a projection module, including: obtaining a projection environment where the projection module is located, and determining a position of a target person according to the projection environment; planning the best projection position in the projection environment according to the projection environment and the position of the target person.

An embodiment of the present disclosure also proposes a projection system, including: a projection module, which is used for projecting picture contents; an environment collection module, which is used for collecting a projection environment where the projection module is located; a rotating mechanism which is used for adjusting a projection direction of the projection module; a memory; a processor, which respectively connected with the memory, the projection module, the environment collection module and the rotation mechanism; and a program which is stored on the memory and runs on the processor, and when the program is executed by the processor, the operations of the method for controlling projection of the projection module as described above are realized.

An embodiment of the present disclosure also proposes a readable non-transitory storage medium; a computer program is stored on the readable storage medium; and when the computer program is executed by a processor, the operations of the method for controlling projection of the projection module as described above are realized.

BRIEF DESCRIPTION OF THE DRAWINGS

One or more embodiments are exemplified by the figures in the corresponding drawings. These example descriptions do not constitute a limitation on the embodiments. The components/modules and steps with the same reference numerals in the drawings represent for similar components/modules and steps, unless otherwise stated, and the figures in the drawings do not constitute a limitation of scale.

DETAILED DESCRIPTION

It should be understood that, specific embodiments described herein are only used to explain the present invention, but not to limit the present invention.

Figure 1:
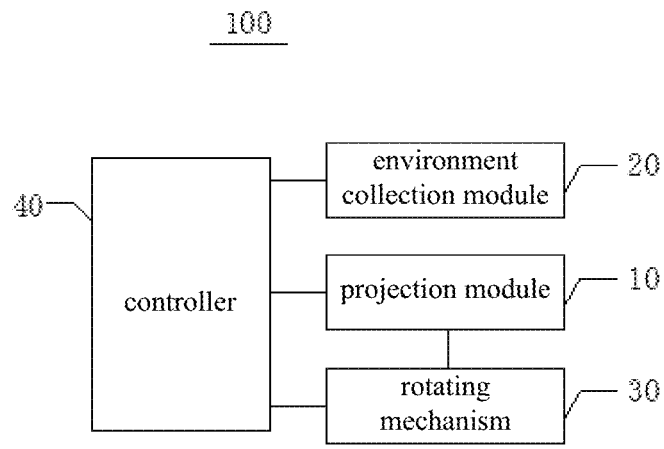
FIG. 1 is a structural schematic diagram of a projection system proposed in an embodiment of the present disclosure.

Please refer to FIG. 1, one embodiment of the present disclosure proposes a projection system 100 that includes a projection module 10, an environment collection module 20, a rotating mechanism 30 and a controller 40, wherein the controller 40 is connected with the projection module 10, the environment collection module 20 and the rotating mechanism 30 respectively.

The projection module 10 is used for projecting the display picture content to the projection area, and the projection picture can adopt any image with suitable image format. For example, the projection module 10 can be any suitable type of projection module 10, such as the projection module 10 using CRT, LCD, DLP or DLV technology.

The environment collection module 20 is used for collecting environment data of the projection environment where the projection module 10 is located. In some embodiments, the environment collection module 20 includes a three-dimensional space modeling unit, an object recognition unit, and a face recognition unit, wherein the three-dimensional space modeling unit is used for obtaining space environment information (for example, the length, width, and height of the space environment), and constructing the three-dimensional space model according to the space environment information. For example, the three-dimensional space modeling unit includes a scanning camera; and the scanning camera is used for obtaining the three-dimensional space information. In some other embodiments, the three-dimensional space modeling unit further includes an infrared three-dimensional tester. The space environment is scanned by the infrared three-dimensional tester so as to obtain three-dimensional space information. The object recognition unit is used for processing and recognizing image features to obtain the position and type of the obstacle (for example, tables, cabinets, flower pots, televisions, etc.). The face recognition unit is used for processing and recognizing the image features to obtain the position and face orientation of the person, namely, determining the face deflection angle of the target person in the projection environment.

The rotating mechanism 30 is used for moving the projection picture projected by the projection module 10 to a designated position (the best projection position) or along a designated path according to the rotating angle. In the present embodiment, the controller 40 receives the environmental information fed back by the environment collection module 20; the rotating mechanism 30 can be driven according to the environment information, so that the rotating mechanism 30 directs the projection direction of the projection module 10 to a certain projection position, or moves along a certain projection transferring path.

It is understandable that, the projection system 100 can be configured in any shape and used in any suitable business scenario. For example, the projection module 10 can be configured as a projection mobile phone, a large projector, a projection TV, and so on.

As another aspect of embodiments of the present disclosure, an embodiment of the present disclosure also provides a method for controlling the projection of the projection module. The method for controlling the projection of the projection module can be used as a collection of a plurality of instructions and applied to the projection system 100 provided in the above embodiment, so that the projection system 100 executes the plurality of instructions to achieve the purpose or function of the method for controlling the projection of the projection module.

Based on the above hardware structure, the present disclosure proposes various embodiments of the method of the present disclosure.

Figure 2:
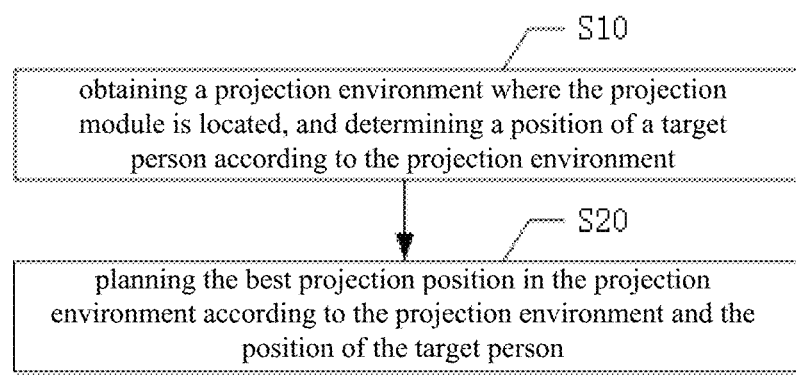
FIG. 2 is a flow chart of a method for controlling projection of a projection module according to an embodiment of the present disclosure.

Referring to FIG. 2, one of embodiments of the present disclosure proposes a method for controlling projection of a projection module. The method for controlling the projection of the projection module is applied to the above hardware environment and application scene. Specifically, the method for controlling the projection of the projection module includes the following operations.

Operation S10, obtaining a projection environment where the projection module 10 is located, and determining a position of a target person according to the projection environment.

The environment collection module 20 obtains the projection environment where the projection module 10 is located, and determines the position of the target person according to the projection environment, wherein the projection environment refers to the external environment where the projection module 10 is located; the projection environment may include three-dimensional space information and objects and persons located in the three-dimensional space.

In the present embodiment, the environment collection module 20 obtains the projection environment where the projection module 10 is located, and determines the position of the target person in the three-dimensional space according to the three-dimensional space information of the projection environment and the objects and persons in the three-dimensional space. For example, the environment collection module 20 includes a scanning camera. The scanning camera obtains the three-dimensional space information by scanning the space environment, and uses the object recognition unit and the face recognition unit to respectively determine objects and persons in the three-dimensional space, wherein in the object recognition process, the type of the object and the position in the three-dimensional space can be known; and in the persons recognition process, the face orientation and the position in the three-dimensional space of the persons can be obtained. Optionally, the environment collection module 20 further includes an infrared three-dimensional tester; and the space environment can be scanned through the infrared three-dimensional tester so as to obtain three-dimensional space information.

Operation S20, planning the best projection position in the projection environment according to the projection environment and the position of the target person.

The controller 40 plans the best projection position in the projection environment according to the projection environment and the position of the target person, wherein the target person refers to the person in the projection environment. The projection position refers to the position where the projection picture appears in the projection environment. The best projection position is related to the target person and the obstacle in the projection environment. For example, the best projection position keeps away from the obstacle and the position where the face of the target person faces, wherein the obstacle refers to the object that can block the projection picture apart from the person in the projection environment so that the projection picture is not displayed on the same flat plane.

In the present embodiment, the best projection position of the projection picture is planned according to the face orientation of the target person and obstacle in the projection environment.

Figure 3:
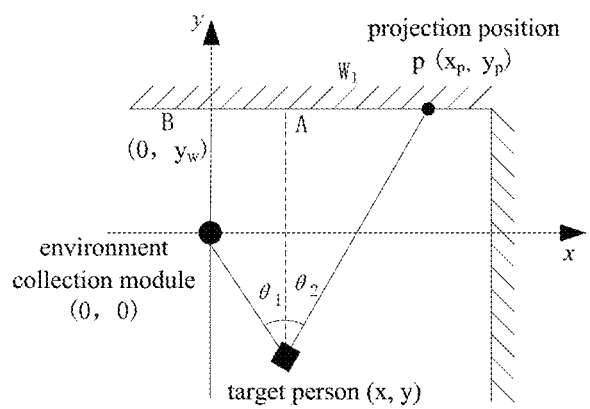
FIG. 3 is a schematic diagram of calculating a projection position proposed by an embodiment of the present disclosure.

Please refer to FIG. 3. Here, the present embodiment proposes a method for calculating the best projection position; the method is specifically as follows.

After the environment collection module 20 obtains the projection environment; a three-dimensional space model is constructed according to the projection environment; the position of the target person in the three-dimensional space model is determined; and the face deflection angle of the target person in the three-dimensional space model is determined. In order to facilitate the explanation of the principle of this method, the environment collection module 20 is used as the origin to construct a Descartes rectangular coordinate system. For example, the coordinates of the environment collection module 20 are (0, 0), the coordinates of the target person are (x, y), the distance between the target person and the environment collection module 20 in the abscissa direction is x, and the distance in the ordinate direction is −y, wherein the deflection angle of the face sensed by the environment collection module 20 is θ, the ordinate of the wall $W_1$ is $y_w$, then the coordinates of the point B are (0, $y_w$), the coordinates of the point A are (x, $y_w$), and the distance between the target person and the wall $W_1$ is $y_w-y$. Therefore, the following formula can be used:

$$\theta = \theta_1 + \theta_2;$$

$$\tan\theta_1 = \frac{x}{-y};$$

$$\tan\theta_2 = \frac{x_p - x}{y_w - y}.$$

The coordinates of the best projection position P are calculated:

$$x_p = x + (y_w - y) \cdot \tan\theta_2 = x + (y_w - y) \cdot \tan\left(\theta - \arctan\frac{x}{-y}\right);$$

$$y_p = y_w.$$

It is understandable that, the above method of calculating the best projection position is only an exemplary method, and does not limit the disclosure concept of the present disclosure.

In the present embodiment, the best projection position in the projection environment is planned according to the position of the target person, so that the projection picture in the projection module 10 can be adaptively changed along the position of the target person to fit with the current status of the target person to improve the perception experience of the user.

Further, on the basis of the above embodiment, operation S10, obtaining a projection environment where the projection module 10 is located, and determining a position of a target person according to the projection environment, specifically including the following operations.

Operation S11, obtaining the projection environment where the projection module 10 is located.

Operation S12, constructing a three-dimensional space model according to the projection environment, and determining the position of the target person in the three-dimensional space model.

In the present embodiment, the environment collection module 20 obtains the projection environment where the projection module 10 is located, and constructs a three-dimensional space model according to the projection environment. For example, the three-dimensional space modeling unit obtains the space environment, and the three-dimensional space model is constructed based on the Descartes rectangular coordinate system, wherein the face recognition unit recognizes the person in the three-dimensional space model as the target person. Optionally, if there is a plurality of persons in the projection environment, the face recognition unit performs face recognition on the plurality of persons one by one; and if the face feature of one of the persons matches the pre-stored face feature, the person is determined as the target person. Further, the object recognition unit recognizes objects in the projection environment to distinguish the object from the target person.

Further, on the basis of the above embodiment, operation S20, planning the best projection position in the projection environment according to the projection environment and the position of the target person, specifically including the following operations.

Operation S21: determining a face orientation of the target person, and taking the intersection of the face orientation of the target person in the projection wall in the projection environment as the best projection position.

In the present embodiment, the face recognition unit recognizes the target person through face feature, and determines the face orientation of the target person according to the face features. Optionally, for the convenience of calculation, the deflection angle of the face of the target person can be determined based on the position of the target person in the three-dimensional space model, that is, the face orientation of the target person can be determined.

In the present embodiment, the intersection of face orientation of the target person in the projection wall in the projection environment is used as the best projection position, so that the projection position is more suitable for the current status of the person so as to improve the experience of the product.

Further, on the basis of the above embodiment, operation S20, after planning the best projection position in the projection environment according to the projection environment and the position of the target person, including the following operations.

Operation S30: obtaining a current projection position of the projection module 10.

Operation S40: identifying an obstacle between the current projection position and the best projection position in the projection environment.

Operation S50: calculating a projection transferring path according to the current projection position, the obstacle and the best projection position, wherein the projection transferring path avoids the obstacle.

Operation S60: calculating a projection rotating angle according to the projection transferring path, and adjusting the projection direction of the projection module 10 according to the rotating angle until the projection direction of the projection module 10 faces the best projection position.

In the present embodiment, the environment collection module 20 constructs the three-dimensional space model; and after determining the obstacles and target person in the three-dimensional space model, the projection transferring path for transferring the projection picture projected by the projection module 10 to the best projection position can be calculated, wherein the projection transferring path is calculated according to the current projection position, obstacles and the best projection position, the projection transferring path keeps away from the obstacles; the projection rotating angle is calculated according to the projection transferring path; and the projection direction of the projection module 10 is adjusted based on the rotating angle until the projection direction of the projection module 10 is toward the best projection position.

For example, taking the projection point of the current projection picture as the starting point and the best projection position as the end point, the best projection transferring path having the shortest moving distance and keeping away from all obstacles is formed.

Figure 4:
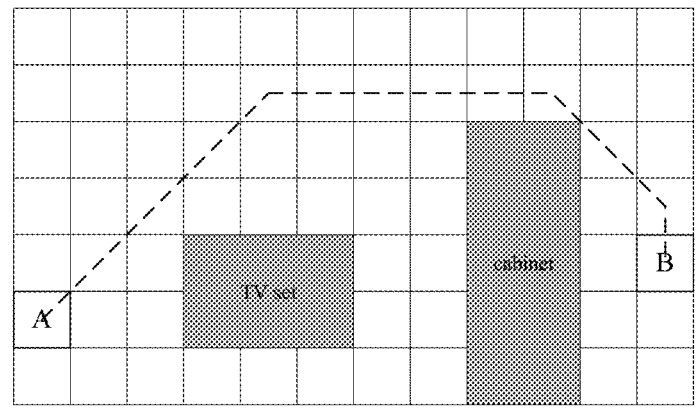
FIG. 4 is a schematic diagram of calculating a projection transferring path proposed by an embodiment of the present disclosure.

Please refer to FIG. 4, the present embodiment proposes an exemplary method for calculating the projection transferring path, wherein there are two obstacles on the projection wall: TV set and cabinet. The projection point A of the current projection picture is taken as the starting point, and point B is taken as the best projection position, which is the end point. In order to facilitate the calculation of the path, the projectable area of the whole projection wall (that is, the area excluding obstacles) is divided into a plurality of squares. However, each square has a plurality of adjacent squares. For each adjacent square, different paths and weights can be assigned according to the direction, so that the projection transferring path from point A to point B that avoids obstacles can be drawn (the dotted line shown in FIG. 4). It should be pointed out that assigning different weights to different directions may result in different best paths. The dotted line path shown in FIG. 4 is only an exemplary display, and does not limit the best projection transferring path proposed in the present disclosure.

In the present embodiment, the required rotating angle is calculated according to the projection transferring path, wherein the rotating mechanism 30 drives the projection direction of the projection module 10 to the best projection position according to the rotating angle.

Figure 5:
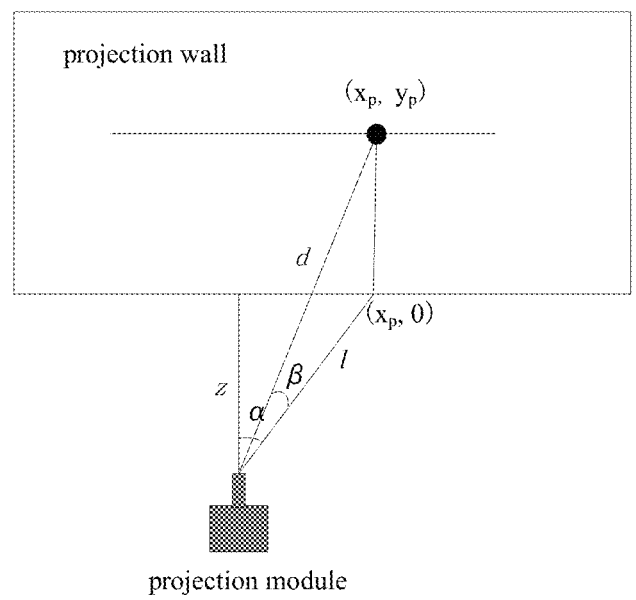
FIG. 5 is a schematic diagram of calculating a deflection angle of a projection picture proposed by an embodiment of the present disclosure.

Please refer to FIG. 5, the present embodiment provides a method for calculating the rotating required for the rotating mechanism 30. For the convenience of calculation, the vertical distance between the projection module 10 and the projection wall is z, and the coordinates of the point of the projection module 10 facing the projection wall are set to (0, 0); the horizontal right direction is x axis, and the upward direction is y axis. When the center point of the projection picture is at the coordinates (0, 0), it is assumed that the projection picture has no deflection, and the coordinates of the center point of the projection picture are $(x_p, y_p)$, and the projection picture needs to deflect Alpha angle in the horizontal direction and deflect Beta angle in the vertical direction; and according to the trigonometric function relationship, it can obtain:

$$\alpha = \arctan\frac{x_p}{z};$$

$$\beta = \arctan\frac{y_p}{\sqrt{x_p^2 + z^2}}.$$

Thus, the deflection angle of the projection pictures at two adjacent projection positions can be obtained.

For two adjacent projection positions, the rotating angle required by the rotating mechanism 30 can be obtained by calculating the deflection angle difference, so that the rotating mechanism 30 sets the transmission parameters (for example, the gear reduction ratio) according to the rotating angle, and the projection picture is moved to the best projection position along the projection transferring path.

Further, in the process of driving the projection direction of the projection module 10 toward the best projection position; the projection distance between the projection module 10 and the best projection position is calculated in real time; and according to the projection, and the projection picture of the projection module 10 is adjusted according to the projection distance.

In the present embodiment, when the projection picture projected by the projection module 10 moves along the projection transferring path, the projection picture is unstable; it is easy to produce undesirable projection picture quality. Therefore, during the movement, the projection module 10 is adjusted to stabilize the projection picture.

For example, the focal length of the projection module 10 is adjusted according to the projection distance to make the picture quality clear.

Keystone correction and/or rotation correction is performed on the projection picture projected by the projection module 10 according to the projection distance.

The projection distance refers to the linear distance between the projection module 10 and the projection position where the projection picture is located, wherein the projection distance is changed along the movement of the projection picture.

In order to make the projection picture quality clear, in the process of moving the projection picture, the projection distance is detected in real time; and the projection module 10 is automatically focused and adjusted according to the projection distance. For example, for a projector, in the process of automatic focusing and adjusting, the focus adjustment parameters are only related to the projection distance. Therefore, a correspondence table between the projection distance and the focus adjustment parameters can be established. For a specific projection distance, the projection module 10 is configured as the corresponding focus adjustment parameters. Taking FIG. 5 as an example, the specific implementation process is as follows: a three-dimensional space model of the projection environment is constructed; a corresponding table of projection distance and focus adjustment parameters is established; the rotating mechanism 30 drives the projection picture to move along the projection transferring path; the projection distance d is calculated in real time according to the three-dimensional space model and the determined rotating angle; according to the projection distance d, the projection module 10 is configured as a corresponding focus adjustment parameter.

As shown in FIG. 5, a method for calculating the projection distance d is proposed as follows.

Since the rotating angles of the three-dimensional space model and the projection picture are known, the vertical distance z between the projection module 10 and the projection wall at this time; and the deflection angles Alpha and Beta of the projection picture relative to the projection wall can be obtained. Assuming that the coordinates of the center point of the current projection picture are $(x_p, y_p)$, the distance between the coordinate point $(x_p, y_p)$ and the projection module 10 (projection distance) is d, and the distance between the coordinate point $(x_p, 0)$ and the projection module 10 is 1, the projection distance d can be calculated by the following formula:

$$l = \frac{z}{\cos\alpha};$$

$$d = \frac{l}{\cos\beta} = \frac{z}{\cos\alpha\cos\beta}.$$

In the present embodiment, the projection module 10 can realize automatic focusing according to the projection distance detected in real time to keep the projection picture clear, and the product use is more flexible.

When correcting and adjusting the projection picture, it includes keystone correction and/or rotating correction. Since the positions of the three-dimensional space model of the projection environment and the projection module 10 in the three-dimensional space model have been known, the deflection angle of the projection picture (including the horizontal deflection angle Alpha and the vertical deflection angle Beta) can be calculated, and then the projection picture can be corrected and adjusted by the correction algorithm in the prior art.

Further, in the process of driving the projection direction of the projection module 10 toward the best projection position, the illumination light source of the projection module 10 is controlled to control the projection time of the projection module 10.

In the present embodiment, when the rotating mechanism 30 drives the projection direction of the projection module 10 toward the best projection position, the light source control module can control the status of the light source required by the projection module 10 to control the projection time of the projection module 10.

For example, when the projection picture moves from one position to the next position, if the projection content does not need to follow the movement, the LED lights of the projection module 10 can be turned off, thereby reducing the power consumption of the projection module 10 and facilitating the design of the heat dissipation function, wherein the control command of the LED light can be set according to the rotating angle, can also be set according to the rotating time, and can also be determined according to the projection content. For example, the LED light can be controlled by the rotating the angle, and the LED light of the projection module 10 is turned off within certain specified angle range; for scenes that project specified (random) content at specified positions, or project specified (random) content at random position, the LED light can be controlled by time, and the LED light is turned off within the specified time range.

Figure 6:
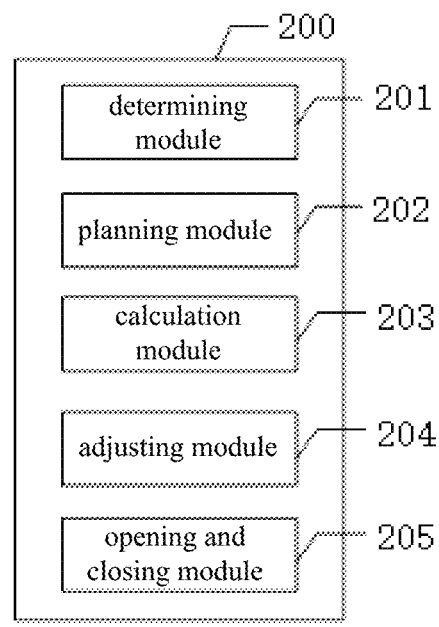
FIG. 6 is a block diagram of a device for controlling projection of a projection module proposed by an embodiment of the present disclosure.

In addition, please refer to FIG. 6, an embodiment of the present disclosure also proposes a device 200 for controlling projection of a projection module, including a determining module 201 and a planning module 202.

The determining module 201 is used for obtaining a projection environment where the projection module 10 is located, and determining a position of a target person according to the projection environment.

The planning module 202 is used for planning the best projection position in the projection environment according to the projection environment and the position of the target person.

Further, the determining module 201 is also used for obtaining the projection environment where the projection module 10 is located; constructing a three-dimensional space model according to the projection environment, and determining the position of the target person in the three-dimensional space model.

Further, the planning model 202 is also used for determining a face orientation of the target person, and taking the intersection of the face orientation of the target person in the projection wall in the projection environment as the best projection position.

Further, the projection device also includes a calculation module 203, which is used for obtaining a current projection position of the projection module 10; identifying the obstacles between the current projection position and the best projection position in the projection environment; calculating a projection transferring path according to the current projection position, the obstacle and the best projection position, wherein the projection transferring path keeps away from the obstacle; the projection rotating angle is calculated according to the projection transferring path, and the projection direction of the projection module 10 is adjusted based on the rotating angle until the projection direction of the projection module 10 faces the best projection position.

Further, the projection device further includes an adjusting module 204, which is used for calculating a projection distance between the project module 10 and the best projection position during the process that the projection direction of the projection module 10 faces the best projection position, and adjusting the projection picture of the projection module 10 according to the projection distance. The adjusting module 204 is further used for adjusting a focal length of the projection module 10 according to the projection distance to make the picture quality clear; and the projection picture projected by the projection module 10 is subjected to keystone correction and/or rotating correction according to the projection distance.

Further, the projection device further includes an opening and closing module 205, which is used for controlling an illumination light source of the projection module 10 when the projection direction of the projection module 10 faces the best projection position, so as to control the projection time of the projection module 10.

In the present embodiment, the best projection position in the projection environment is planned according to the position of the target person, so that the projection picture in the projection module 10 can be adaptively changed along the position of the target person to fit with the current status of the target person to improve the perception experience of the user.

For the specific definition of the projection device, please refer to the above definition of the method for controlling the projection of the projection module, which will not be repeated here. Each module in the above projection device can be implemented in whole or in part by software, hardware, and a combination thereof. The above modules may be embedded or independent of the processor in the computer equipment in the form of hardware, or may be stored in the memory of the computer equipment in the form of software, so that the processor can call and execute the operations corresponding to the above modules.

Figure 7:
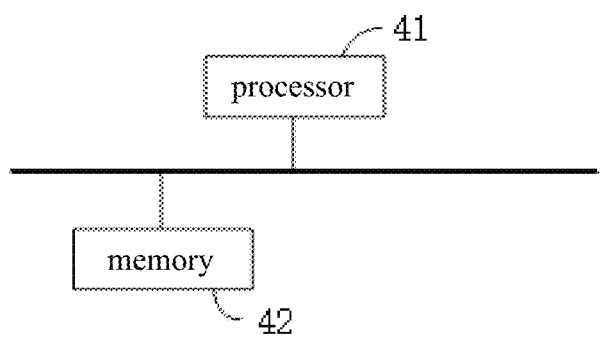
FIG. 7 is a schematic diagram of a projection system proposed by an embodiment of the present disclosure.

Please refer to FIGS. 1 and 7, FIG. 7 is a schematic diagram of a projection system 100 provided by an embodiment of the present disclosure. The projection system 100 includes: a projection module 10, an environment collection module 20, a rotating mechanism 30, and one or a plurality of processors 41 and a memory 42, wherein the controller 40 includes one or a plurality of processors 41 and a memory 42. FIG. 7 takes one processor 41 as an example. The processor 41 and the memory 42 may be connected by a bus or in other ways. In FIG. 7, the connection by a bus is taken as an example.

For the above environment collection module 20, the environment collection module 20 is used for collecting the environment data of the projection environment where the projection module 10 is located. For example, the environment collection module 20 is a camera, and the image of the projection environment is collected through the camera; and the environment data of the projection environment is analyzed according to the image.

For the above rotating mechanism 30, the rotating mechanism 30 is used for adjusting a projection direction of the projection module 10.

As a non-volatile computer readable storage medium, the memory 42 can be used for storing non-volatile software programs, non-volatile computer executable programs and modules, such as program instructions/modules corresponding to the methods in the embodiments of the present disclosure (for example, the determining module 201, the planning module 202, the calculation module 203, the adjusting module 204, and the opening and closing module 205 shown in FIG. 6). The processor 41 executes various functional applications and data processing of the server by running non-volatile software programs, instructions, and modules stored in the memory 42, that is, implements the methods of the above method embodiments.

The memory 42 may include a storage program area and a storage data area, wherein the storage program area may store an operation system and an application program required by at least one function; the storage data area may store data created according to the use of the projection device. In addition, the memory 42 may include a high-speed random access memory, and may also include a non-volatile memory, such as at least one magnetic disk memory device, a flash memory device, or other non-volatile solid-state memory device. In some embodiments, the memory 42 optionally includes a memory remotely arranged relatively to the processor 41, and these remote memories can be connected to the projection device by the network. Examples of the above networks include, but are not limited to, the Internet, corporate intranets, local area networks, mobile communication networks, and combinations thereof.

The one or a plurality of modules are stored in the memory 42, and when executed by the one or a plurality of processors 41, the method in any of the above method embodiments is executed, for example, the operation S10-S20 of the method in FIG. 2 described above is executed, and the functions of the determining module 201, the planning module 202, the calculation module 203, the adjusting module 204, and the opening and closing module 205 in FIG. 6 are implemented.

The above products can execute the methods provided in the embodiments of the present disclosure, and have functional modules and beneficial effects corresponding to the execution methods. For technical details not described in detail in the present embodiment, please refer to the method provided in the embodiment of the present disclosure.

Terminals of the embodiments of the present disclosure exist in various forms, including but not limited to the follows. Mobile communication equipment: this type of equipment is characterized by mobile communication functions, and the main targets are to provide voice and data communications. Such terminals include: smart phones (such as iPhone), multimedia phones, functional phones, and low-end phones. Ultra-mobile personal computer equipment: this type of equipment belongs to the category of personal computers, has calculation and processing functions, and generally also has mobile Internet features. Such terminals include: PDA, MID and UMPC devices, such as iPad. Server: a device that provides computing services, the composition of a server includes a processor, hard disk, memory, system bus, etc. The server is similar to a general computer architecture, but due to providing highly reliable services, therefore, the processing capacity, stability, reliability, safety, scalability, and manageability have higher requirements. Other electronic devices with data interaction functions.

The embodiments of the present disclosure provide a non-volatile computer readable storage medium, the non-volatile computer readable storage medium stores computer executable instructions, and the computer executable instructions can execute the method in the above method embodiments by an electronic device, for example, execute the operations S10-S20 of the method in FIG. 2 described above to realize the functions of the determining module 201, the planning module 202, the calculation module 203, the adjusting module 204, and the opening and closing module 205 in FIG. 6.

It is worth mentioning that, the processor, bus, and memory of the projection module 10 in the present embodiment form the controller 40 of the projection module 10 in FIG. 1, which is an implementation of the controller 40 in the projection module 10 in FIG. 1.

The embodiment of the disclosure provides a computer program product, including a calculation program stored on a non-volatile computer readable storage medium. The computer program includes program instructions, when the program instructions are executed by a computer, the computer executes the method in any of the above method embodiments; for example, execute the operations S10-S20 of the method described above in FIG. 2 to realize the functions of the determining module 201, the planning module 202, the calculation module 203, the adjusting module 204, and the opening and closing module 205 in FIG. 6.

The device embodiments described above are merely illustrative. The units described as separate components may or may not be physically separated, and the components displayed as units may or may not be physical units, that is, they may be located in one place, or it can be distributed to a plurality of network units. Some or all of the modules may be selected according to actual needs to achieve the purpose of the scheme of the embodiments.

Through the description of the above implementation manners, those ordinarily skilled in the art can clearly understand that each implementation manner can be implemented by means of software and a general hardware platform, and of course, it can also be implemented by hardware. Those ordinarily skilled in the art can understand that all or part of the processes in the methods of the above embodiments can be implemented by computer programs instructing relevant hardware. The programs can be stored in a computer readable storage medium. When executed, it may include the procedures of the above method embodiments, wherein the storage medium can be a magnetic disk, an optical disk, a read-only memory (ROM), or a random access memory (RAM), etc.

Finally, it should be noted that the above embodiments are only used for illustrating the technical solutions of the present disclosure and not limiting them. Under the idea of the present disclosure, the above embodiments or the technical features in different embodiments can also be combined. The operations can be implemented in any order, and there are many other variations in different aspects of the disclosure as described above. For the sake of brevity, they are not provided in details; although the disclosure has been described in detail with reference to the above embodiments, those ordinarily skilled in the art should understand that: they can still modify the technical scheme recorded in the above embodiments, or equivalently replace some of the technical features; and these modifications or substitutions do not make the essence of the corresponding technical schemes deviate from the scope of implementing the technical scheme.

The invention claimed is:

1. A method for controlling projection of a projection module, comprising:
   obtaining a projection environment where the projection module is located, and determining a position of a target person according to the projection environment; and
   planning a best projection position in the projection environment according to the projection environment and the position of the target person;
   obtaining a current projection position of the projection module;
   identifying an obstacle between the current projection position and the best projection position in the projection environment;
   calculating a projection transferring path according to the current projection position, the obstacle, and the best projection position, wherein the projection transferring path avoids the obstacle; and
   calculating a projection rotating angle according to the projection transferring path, and adjusting a projection direction of the projection module according to the rotating angle until the projection direction of the projection module faces the best projection position.

2. The method according to claim 1, wherein the operation of obtaining a projection environment where the projection module is located and determining a position of a target person according to the projection environment comprises:
obtaining the projection environment where the projection module is located; and
constructing a three-dimensional space model according to the projection environment, and determining the position of the target person in the three-dimensional space model.

3. The method according to claim 1, wherein the operation of planning the best projection position in the projection environment according to the projection environment and the position of the target person comprises:
determining a face orientation of the target person, and taking an intersection of the face orientation of the target person in a projection wall in the projection environment as the best projection position.

4. The method according to claim 1, wherein the method further comprises:
calculating a projection distance between the projection module and the best projection position during the process in which the projection direction of the projection module faces the best projection position, and adjusting a projection picture of the projection module according to the projection distance.

5. The method according to claim 4, wherein the operation of adjusting a projection picture of the projection module according to the projection distance comprises:
adjusting a focal length of the projection module according to the projection distance to make the picture quality clear; and
performing keystone correction and/or rotation correction on the projection picture projected by the projection module according to the projection distance.

6. The method according to claim 1, wherein the method further comprises:
controlling an illumination light source of the projection module during the process that the projection direction of the projection module faces the best projection position, thereby controlling a projection time of the projection module.

7. A projection system, comprising:
a projection module, which is used for projecting picture contents;
an environment collection module, which is used for collecting a projection environment where the projection module is located;
a rotating mechanism, which is used for adjusting a projection direction of the projection module;
a memory;
a processor, which is respectively connected with the memory, the projection module, the environment collection module and the rotation mechanism; and
a program, which is stored on the memory and runs on the processor, and when the program is executed by the processor, a method for controlling projection of a projection module is realized, the method comprising:
obtaining a projection environment where the projection module is located, and determining a position of a target person according to the projection environment; and
planning a best projection position in the projection environment according to the projection environment and the position of the target person;

obtaining a current projection position of the projection module;
identifying an obstacle between the current projection position and the best projection position in the projection environment;
calculating a projection transferring path according to the current projection position, the obstacle, and the best projection position, wherein the projection transferring path avoids the obstacle; and
calculating a projection rotating angle according to the projection transferring path, and adjusting a projection direction of the projection module according to the rotating angle until the projection direction of the projection module faces the best projection position.

8. The projection system according to claim 7, wherein the operation of obtaining a projection environment where the projection module is located and determining a position of a target person according to the projection environment comprises:
obtaining the projection environment where the projection module is located; and
constructing a three-dimensional space model according to the projection environment, and determining the position of the target person in the three-dimensional space model.

9. The projection system according to claim 7, wherein the operation of planning the best projection position in the projection environment according to the projection environment and the position of the target person comprises:
determining a face orientation of the target person, and taking an intersection of the face orientation of the target person in the projection wall in the projection environment as the best projection position.

10. The projection system according to claim 7, wherein the method further comprises:
calculating a projection distance between the projection module and the best projection position during the process in which the projection direction of the projection module faces the best projection position, and adjusting a projection picture of the projection module according to the projection distance.

11. The projection system according to claim 10, wherein the operation of adjusting a projection picture of the projection module according to the projection distance comprises:
adjusting a focal length of the projection module according to the projection distance to make the picture quality clear; and
performing keystone correction and/or rotation correction on the projection picture projected by the projection module according to the projection distance.

12. The projection system according to claim 7, wherein the method further comprises:
controlling an illumination light source of the projection module during the process that the projection direction of the projection module faces the best projection position, thereby controlling a projection time of the projection module.

13. A readable non-transitory storage medium, wherein a computer program is stored on the storage medium, and when the computer program is executed by a processor, a method for controlling projection of a projection module is realized, the method comprising:
obtaining a projection environment where the projection module is located, and determining a position of a target person according to the projection environment; and planning a best projection position in the projection environment according to the projection environment and the position of the target person;

obtaining a current projection position of the projection module;

identifying an obstacle between the current projection position and the best projection position in the projection environment;

calculating a projection transferring path according to the current projection position, the obstacle, and the best projection position, wherein the projection transferring path avoids the obstacle; and calculating a projection rotating angle according to the projection transferring path, and adjusting a projection direction of the projection module according to the rotating angle until the projection direction of the projection module faces the best projection position.

14. The storage medium according to claim 13, wherein the operation of obtaining a projection environment where the projection module is located and determining a position of a target person according to the projection environment comprises:

obtaining the projection environment where the projection module is located; and constructing a three-dimensional space model according to the projection environment, and determining the position of the target person in the three-dimensional space model.

15. The storage medium according to claim 13, wherein the operation of planning the best projection position in the projection environment according to the projection environment and the position of the target person comprises:

determining a face orientation of the target person, and taking an intersection of the face orientation of the target person in the projection wall in the projection environment as the best projection position.

16. The storage medium according to claim 13, wherein the method further comprises:

calculating a projection distance between the projection module and the best projection position during the process in which the projection direction of the projection module faces the best projection position, and adjusting a projection picture of the projection module according to the projection distance.

17. The projection system according to claim 13, wherein the method further comprises:

controlling an illumination light source of the projection module during the process that the projection direction of the projection module faces the best projection position, thereby controlling a projection time of the projection module.

* * * * *